United States Patent
Amirijoo et al.

(10) Patent No.: US 6,728,217 B1
(45) Date of Patent: Apr. 27, 2004

(54) SYSTEM AND METHOD FOR MODIFYING THE DATA RATE FOR DATA CALLS IN A CELLULAR NETWORK

(75) Inventors: Shahrokh Amirijoo, Richardson, TX (US); Bagher R. Zadeh, Solna (SE); Siavash Farhadi, Dallas, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/375,612

(22) Filed: Aug. 17, 1999

(51) Int. Cl.[7] .................................................. H04L 1/00
(52) U.S. Cl. ........................ 370/252; 370/468; 445/436
(58) Field of Search ............................... 370/252, 465, 370/468; 714/704, 705, 706, 708, 776; 455/436–444, 450, 452.1, 452.2

(56) References Cited

U.S. PATENT DOCUMENTS

| | | | | |
|---|---|---|---|---|
| 5,327,576 A | * | 7/1994 | Uddenfeldt et al. | 370/333 |
| 5,828,677 A | * | 10/1998 | Sayeed et al. | 714/774 |
| 5,862,141 A | * | 1/1999 | Trotter | 370/468 |
| 6,061,549 A | * | 5/2000 | Labonte et al. | 455/67.13 |
| 6,134,220 A | * | 10/2000 | Le Strat et al. | 370/252 |
| 6,163,577 A | * | 12/2000 | Ekudden et al. | 375/242 |
| 6,208,663 B1 | * | 3/2001 | Schramm et al. | 370/465 |
| 6,400,929 B1 | * | 6/2002 | Ue et al. | 455/69 |
| 6,542,742 B2 | * | 4/2003 | Schramm et al. | 455/436 |

* cited by examiner

*Primary Examiner*—Chi Pham
*Assistant Examiner*—Nhat Do (57) ABSTRACT

A telecommunications system and method is disclosed for improving the quality of data calls within a cellular network by dynamically changing the air interface data rate for transparent and non-transparent data services. As the quality of a higher data rate radio link deteriorates below a specified upper quality threshold due to interference, a change of channel coding to a lower data rate is ordered by the network. If the radio link quality measurements after a specified period of time indicate that the quality level has exceeded a specified lower quality threshold, the data rate is changed back to the higher data rate.

27 Claims, 6 Drawing Sheets

SYSTEM AND METHOD FOR MODIFYING THE DATA RATE FOR DATA CALLS IN A CELLULAR NETWORK

BACKGROUND OF THE PRESENT INVENTION

Many cellular networks are currently providing data services, also known as bearer services, for their subscribers. These bearer services provide a transmission path between two access points for data communications, and also provide a user-network interface. To provide these bearer services, cellular networks have established interworking functions for supporting these bearer services within the cellular networks and between the cellular networks and other external networks.

For example, in the Global System for Mobile Communications (GSM) system, each Mobile Switching Center (MSC), has a dedicated GSM Interworking Unit (GIWU) for handling data calls. The main functions of the GIWU include performing modem connections and rate adaptation. Based on the particular bearer service and transmission rate chosen by a mobile subscriber involved in a data call, the GIWU connects the correct modem for the data call. Since the data rate of data received at the MSC from the network is typically higher than the data rate allowed over the air interface, it is typically necessary to adapt the data rate of data received at the MSC from the network to data rates allowed over the air interface before connecting to the modem. Likewise, it is necessary to adapt the data rate of data received at the MSC from the mobile subscriber back to the data rate for the network.

For example, if the data rate received at the MSC from the network is 22.8 kilobits per second (kbps), but the air interface data rate is only 9.6 kbps per traffic channel, the GIWU must adapt the 28.2 kbps data rate to the 9.6 kbps data rate over the air interface. Typically, this involves the GIWU allocating three is separate 9.6 kbps traffic channels to the mobile subscriber to provide the data to that mobile subscriber.

In addition to providing modem connection and rate adaption functions, the GIWU also ensures the quality of service (QoS) for data calls. The two types of QoS attribute values defined for bearer services are transparent service and non-transparent service. For transparent services, data is transmitted transparently through the MSC without any error detection or correction being performed at the MSC. The data rate is negotiated by the mobile subscriber, which ensures a constant and known transmission speed. However, the error rate is not controlled by the system in transparent data calls. By contrast, with the non-transparent service, the data is signal-processed to ensure an error-free transmission of the data received at the MSC from the mobile subscriber. However, due to retransmission capabilities, the actual transmission rate over the air interface may not be constant.

Due to the low band width of the radio channels used in GSM networks, the maximum data rate over the air interface has, in the past, been only 9.6 kbps. However, recently, cellular networks have begun to selectively deploy 14.4 kbps data services. Although the 14.4 kbps data service provides a higher transmission speed, the channel coding method used for the 14.4 kbps data calls is more susceptible to errors and interference over the air interface than 9.6 kbps data calls. This is due to the nature of the channel coding scheme utilized for 14.4 kbps data calls, which provides higher data throughput by using less error correction bits.

Therefore, to maintain good quality during ongoing data calls, a handover to another channel in the same or another cell is sometimes performed. However, in some cases, a handover would not be the best alternative for maintaining the quality. For example, the handover may be to a worse cell, which can increase the likelihood of a dropped call. To avoid these situations, automatic link adaptation (ALA) to change the channel coding for the serving cell for non-transparent data services has been suggested.

For example, in the standards contribution, version T1P1.5/96-227R3, entitled "Proposal for 14.4 and 7.2 kbps Service for PCS1900," a proposal for ALA for non-transparent data services was presented. In this Proposal, it was suggested to dynamically change the data rate from 14.4 kbps to 9.6 kbps to maintain the quality in non-transparent data calls. However, the Proposal only specified the signaling for ALA, not the implementation details, such as what signals to measure or what the decision threshold points should be. In addition, the Proposal specifically states that ALA can only be supported for non-transparent data services.

SUMMARY OF THE INVENTION

The present invention is directed to telecommunications systems and methods for improving the quality of data calls within a cellular network by dynamically changing the air interface data rate for transparent and non-transparent data services. As the quality of a higher data rate radio link deteriorates below a specified upper quality threshold, a change of channel coding to a lower data rate is ordered by the network. If the radio link quality measurements after a specified period of time indicate that the quality level has exceeded a specified lower quality threshold, the data rate is changed back to the higher data rate.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
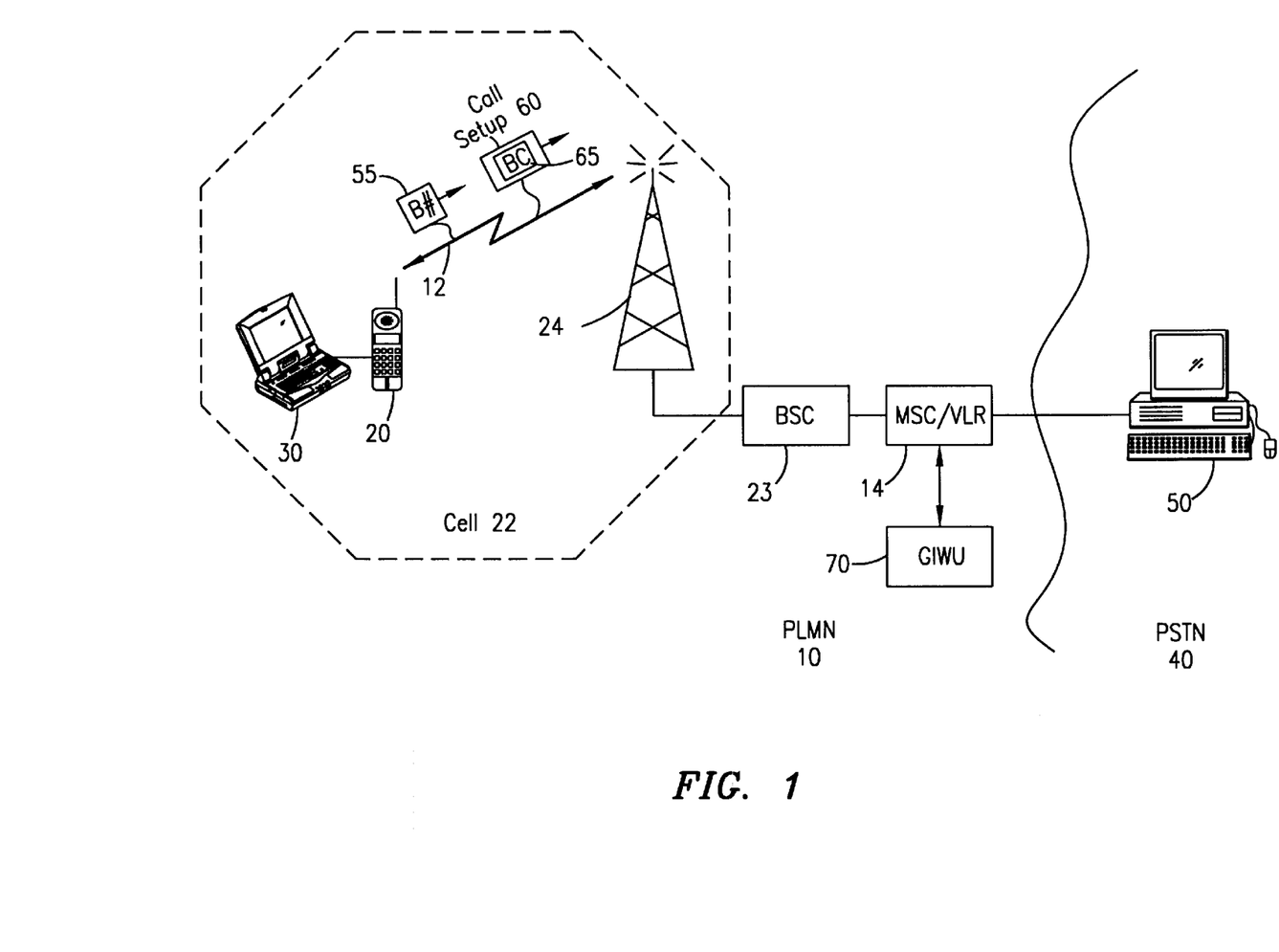
FIG. 1 is a block diagram of a conventional data call in a cellular network.

With reference now to FIG. 1 of the drawings, a sample data call within a digital cellular network 10, such as a Public Land Mobile Network (PLMN) within the Global System for Mobile Communications (GSM) network, is shown. To initiate a data call, terminal equipment (TE) 30 for transmitting, receiving and processing data, such as a laptop computer, must first be connected to a Mobile Station (MS) 20, which is the physical equipment, such as a car phone or other portable phone, used by mobile subscribers to communicate with the cellular network 10. The TE 30 typically provides a B-number 55 for a destination terminal 50 to the MS 20 and instructs the MS 20 to setup a data call to the destination terminal 50. The destination terminal 50 can be, for example, a computer within the Public Switched Telephone Network (PSTN) 40, the Packet Switched Public Data Network (PSPDN) (not shown) or within the PLMN 10, the former being illustrated.

To setup the data call, the MS 20 includes a Bearer Capability (BC) parameter 65, indicating that a data call is being requested, in a call setup message 60 to a Mobile Switching Center/Visitor Location Register (MSC/VLR) 14 serving the MS 20 over an air interface 12 via a serving Base Transceiver Station (BTS) 24 and associated Base Station Controller (BSC) 23. It should be understood that the MSC/VLR 14 provides a circuit switched connection of speech and signaling information between the MS 20 and the cellular network 10. In addition, the BSC 23 performs the radio-related functions, while the BTS 24 is the physical equipment, illustrated for simplicity as a radio tower, that provides radio coverage to a cell 22 for which it is responsible. It should also be understood that the BSC 23 may be connected to several BTS's 24, and may be implemented as a stand-alone node or integrated with the MSC/VLR 14.

Upon receipt of the BC parameter 65 and the B-number 55 associated with the destination terminal 50, the MSC/VLR 14 transfers the BC 65 and B-number 55 to the GSM Interworking Unit (GIWU) 70 to determine the Quality of Service (QoS) attribute value for the data call (transparent data service vs. non-transparent data service), negotiate the data rate and perform rate adaptation and modem connections. Once completed, the GIWU 70 re-routes the call back to the MSC/VLR 14 for completion of the call to the destination terminal 50. During the data call, the GIWU 70 is responsible for adapting the data rate of the air interface 12 to the data rate of the network 10. For example, if the destination terminal 50 transmits data to the GIWU 70 at a rate of 22.8 kbps, and the MS 20 has negotiated a data rate of 14.4 kbps per traffic channel, the GIWU 70 must instruct the BSC 23 to allocate two traffic channels on the air interface 12 for the MS 20, and adapt the data received in the 22.8 kbps transmission to the two 14.4 kbps traffic channels. It should be understood that a traffic channel is a type of logical channel mapped onto one of the physical channels or time slots of a Time Division Multiple Access (TDMA) frame.

It is important that during the data call, the quality of the data transmitted between the MS 20 and the cellular network 10 over the air interface 12 be maintained. The quality of the transmitted data is typically expressed in terms of the bit error rate (BER), which identifies the percentage of the total number of received bits wrongly detected at either the MS 20 or the BTS 24. The lower the BER, the higher the quality. To measure the BER, a channel coding process is used to detect errors in the bit stream. Channel coding uses error control codes, which add redundancy bits to the bit stream to provide more security against errors.

Many cellular networks 10 divide the BER's into separate classes. For example, there could be eight BER classes (0–7), with BER class 0 being the best BER class with a less than one percent BER, and BER class 7 being the worst BER class with a greater than twelve percent BER. Normally, if BER classes are used, the network operator specifies a maximum acceptable BER class, and if the BER class exceeds this maximum acceptable BER class, the network 10 performs a handover of the data call to another channel within the same cell 22 or a different cell (not shown) in order to maintain the quality. However, in some cases, a handover would not be the best alternative for maintaining the quality of the data call.

Figure 2:
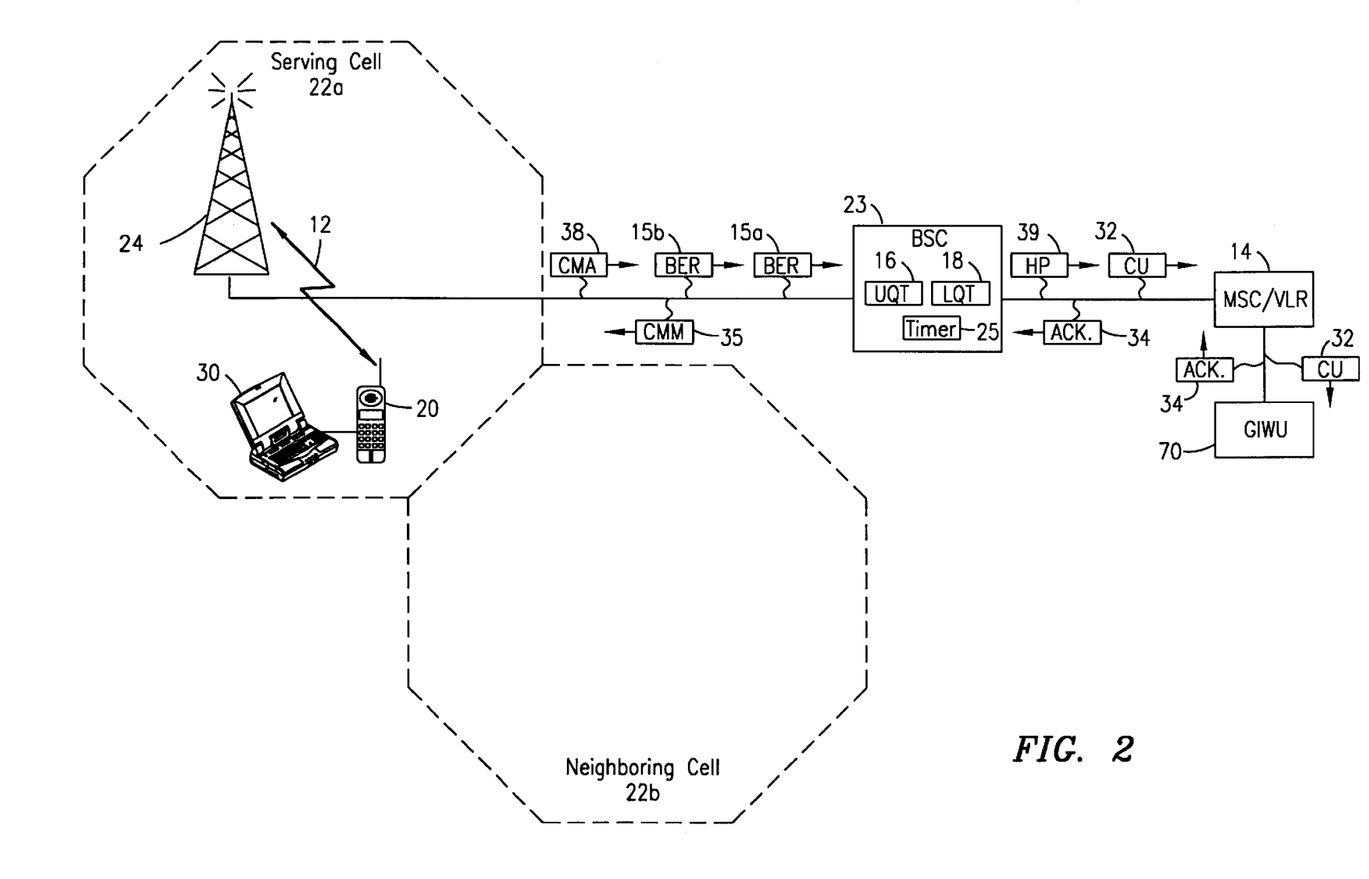
FIG. 2 is an exemplary block diagram illustrating a system for maintaining high quality for a data call in a cellular network in accordance with embodiments of the present invention.
Figure 3A:
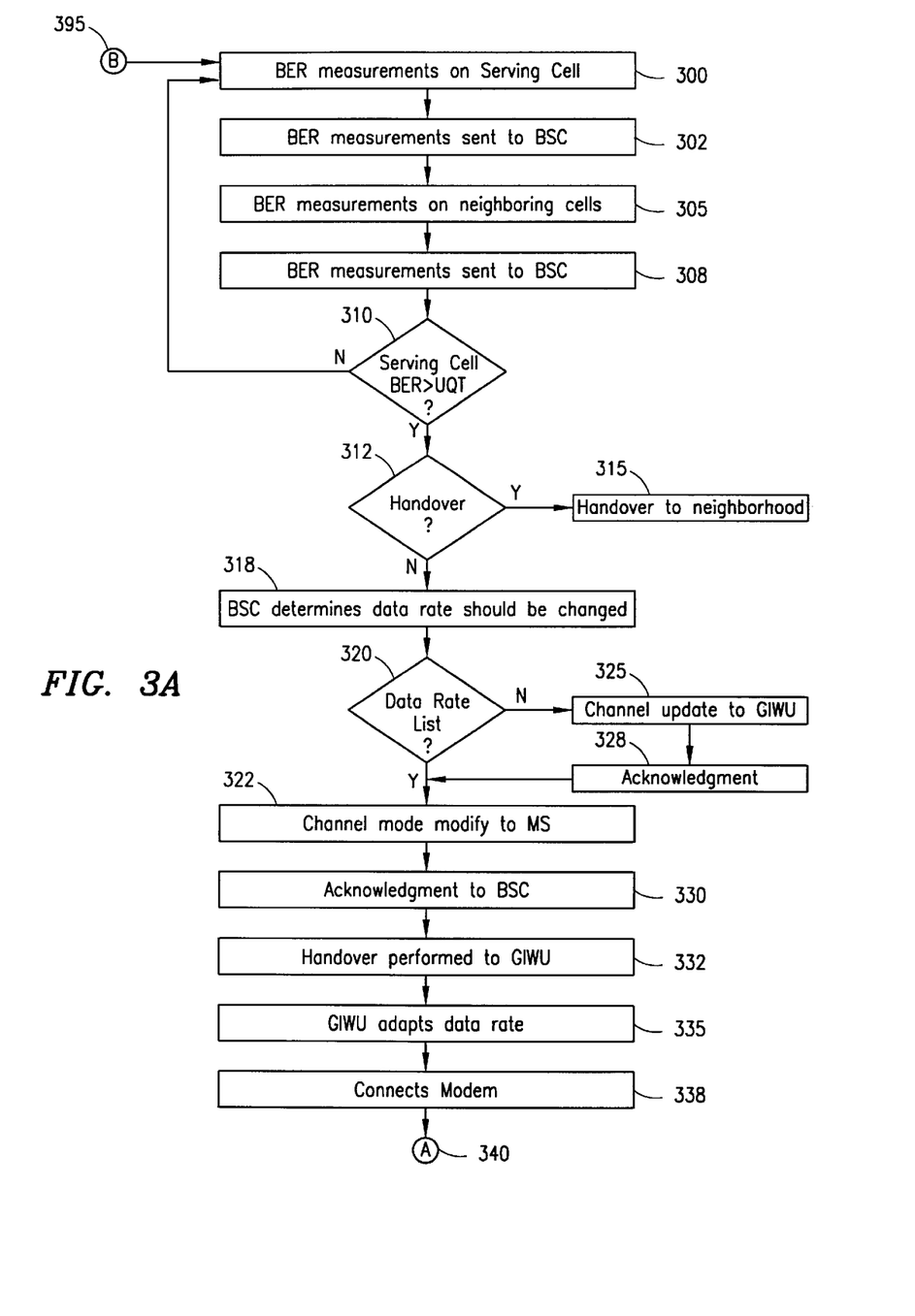
FIGS. 3A and 3B are exemplary flow charts illustrating the steps for maintaining high quality for a data call by dynamically modifying the air interface data rate, if necessary, in accordance with embodiments of the present invention.

Thus, in accordance with embodiments of the present invention, as shown in FIG. 2 of the drawings, which will be described in connection with the steps listed in FIGS. 3A and 3B of the drawings, if a handover is not the best alternative for maintaining the quality of the data call, the air interface 12 data rate of the serving cell 22a could instead be reduced. During the data call, both the MS 20 and the BTS 24 perform signal strength and quality (BER) measurements 15a on the radio link (traffic channel on the air interface 12) between the MS 20 and the BTS 24 (step 300). These signal strength and BER measurements 15a are sent to the BSC 23 as measurement reports (step 302). In addition, the MS 20 also measures the signal strength and BER 15b of at least one neighboring cell 22b (step 305), and passes these measurements 15b to the BSC 23 (step 308).

The BSC 23 analyses the signal strength and BER measurements 15a for the serving cell 22a by comparing the BER measurements 15a to an upper quality threshold 16 (step 310). The upper quality threshold 16 is defined by the network operator, and can be based on a number of factors. For example, if the network already defines a handover threshold, this threshold can be used, or the upper quality threshold 16 can be based on the handover threshold.

If the BSC 23 determines that the quality of the radio link 12 between the MS 20 and the BTS 24 has deteriorated past the upper quality threshold 16 (step 310), e.g., the BER 15a has increased over the upper quality threshold 16, the BSC 23 analyses the signal strength and BER measurements 15b of the neighboring cell(s) 22b (step 312), provided by the MS 20, to determine if the data call should be handed over to one of the neighboring cells 22b (step 315). It should be understood that the deterioration of the quality can be caused, for example, by co-channel or adjacent channel interference, which is most prevalent near the edges of the cell 22a.

To determine whether one of the neighboring cells 22b can provide adequate quality for the data call (step 312), the BSC 23 must consider not only the BER 15b for the neighboring cells 22b at the 14.4 kbps data rate, but also the predicted BER for the serving cell 22a at a lower data rate, such as the 9.6 kbps data rate. If the BER 15b of any neighboring cell 22b at 14.4 kbps is lower (better) than the predicted BER of the serving cell at 9.6 kbps, the BSC 23 chooses the best one of these neighboring cells 22b to perform a handover to (step 315).

However, if all of the neighboring cells 22b have a higher (worse) BER 15b at 14.4 kbps than the serving cell 22a does at 9.6 kbps (step 312), the BSC 23 orders a change of channel coding to a lower data rate in the serving cell 22 (step 318). If the BSC 23 has been provided with a list of acceptable data rates by the GIWU 70 at call setup (step 320), the BSC 23 need only send a Channel Mode Modify message 35, including the parameters for the new channel coding to use, to the MS 20 (step 322). However, if the GIWU 70 did not specify allowable data rates (step 320), the BSC 23 must first request a coding change to the new lower data rate in a Handover Required message or Channel Update message 32 to the MSC/VLR 14 and GIWU 70 (step 325). When the GIWU 70 responds with an Acknowledgment message 34 that the lower data rate is acceptable (step 328), the BSC 23 sends the Channel Mode Modify message 35 to the MS 20 (step 322).

In response to the Channel Mode Modify message 35 (step 322), the MS 20 sends a Channel Mode Modify Acknowledgment 38 message back to the BSC 23, indicating that the new channel coding is now in use (step 330). Thereafter, the BSC 23 sends a Handover Performed message 39 to the MSC/VLR 14 and GIWU 70, informing the GIWU 70 of the new data rate (step 332). In response, the GIWU 70 adapts the data rate to the new lower data rate of 9.6 kbps (step 335) and connects the correct modem for this new lower rate to the data call (step 338). By changing the channel coding to a lower data rate, such as the 9.6 kbps data rate, the number of error detection and/or correction bits can be increased, which decreases the BER.

For non-transparent data calls, the change to the lower data rate can be performed on the same channel or an intra-cell handover to a channel with a 9.6 kbps data rate can be performed. However, for transparent calls, a Configuration Change procedure to the same time slot plus another time slot(s) must be performed in order to change to the lower data rate. For example, one 14.4 channel can be changed to two 9.6 channels. However, if the MS 20 is not multi-slot capable, the Configuration Change procedure cannot be performed. In this case, the call may be dropped.

Figure 3B:
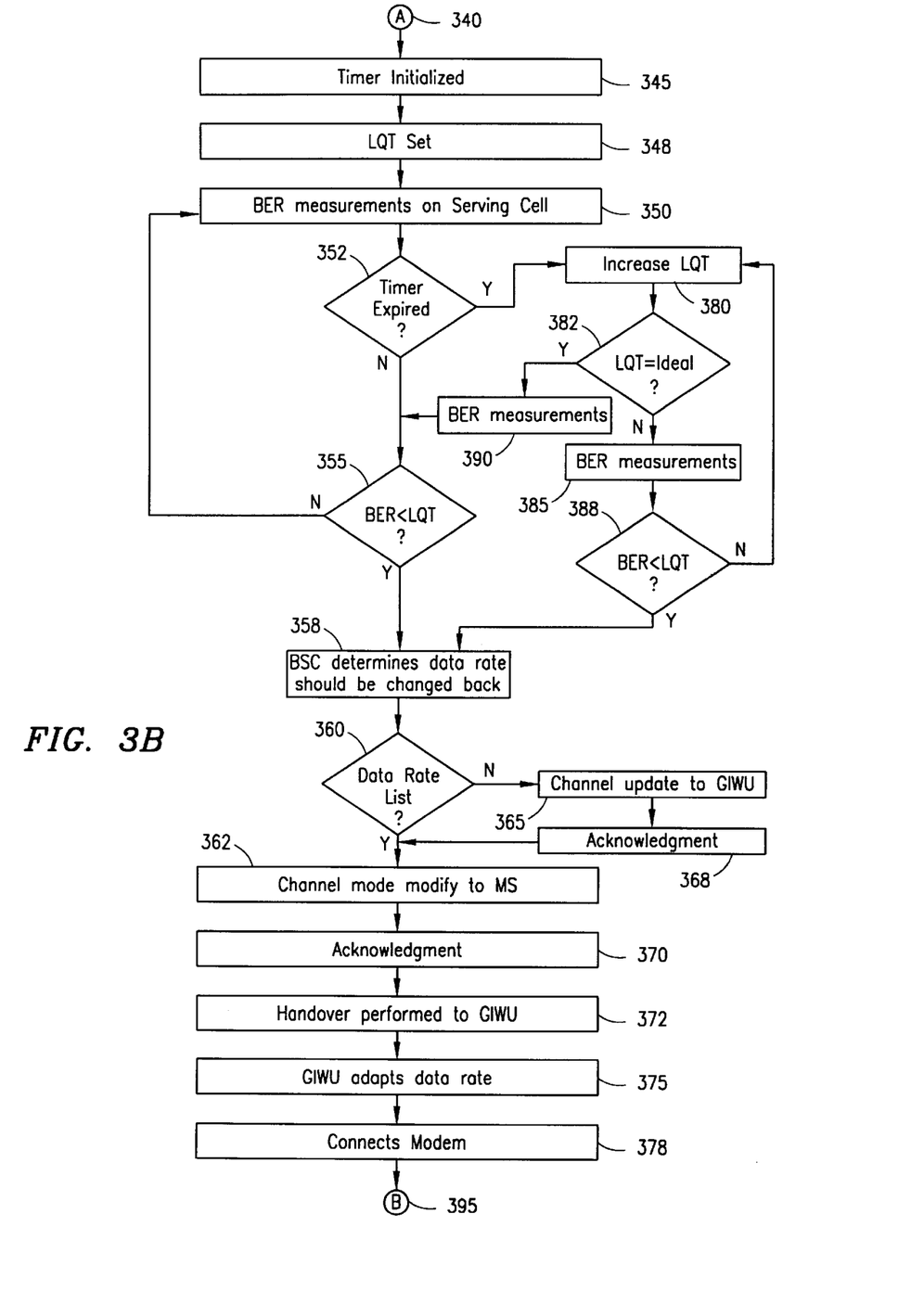

With reference now to FIG. 3B of the drawings, if the data rate is changed to a lower data rate (step 340), the BSC 23 initiates a timer 25 (step 345). The timer 25 prevents the data rate from unnecessarily ping-ponging back and forth between 14.4 kbps and 9.6 kbps. In addition to the timer 25 being initiated, a lower quality threshold 18 is also established (step 348). During the timer 25 period (step 352), the lower quality threshold 18 remains fixed. This lower quality threshold 18 is preferably set to a level associated with an extremely low BER or BER class, which signifies a very good BER. This prevents the ping-pong effect from occurring.

If, during the timer 25 period (step 352), the BER measurements 15a received at the BSC 23 (step 350) decreases below this lower quality threshold 18 (the BER significantly improves) (step 355), the BSC 23 orders the data rate to be changed back to the higher data rate of 14.4 kbps (step 358). Again, if the BSC 23 has been provided with a list of acceptable data rates by the GIWU 70 at call setup (step 360), the BSC 23 need only send the Channel Mode Modify message 35, including the parameters for the old channel coding to use, to the MS 20 (step 362). However, if the GIWU 70 did not specify allowable data rates (step 360), the BSC 23 must first request a coding change to the old higher data rate in the Handover Required message or Channel Update message 32 to the MSC/VLR 14 and GIWU 70 (step 365). When the GIWU 70 responds with the Acknowledgment message 34 that the higher data rate is acceptable (step 368), the BSC 23 sends the Channel Mode Modify message 35 to the MS 20 (step 362).

In response to the Channel Mode Modify message 35 (step 362), the MS 20 sends the Channel Mode Modify Acknowledgment message 38 to the BSC 23, indicating that the old channel coding is now in use (step 370). Thereafter, the BSC 23 sends the Handover Performed message 39 to the MSC/VLR 14 and GIWU 70, informing the GIWU 70 of the higher data rate (step 372). In response, the GIWU 70 adapts the data rate back to the higher data rate of 14.4 kbps (step 375) and connects the correct modem for this higher data rate to the data call (step 378). Thereafter, the process continues (step 395) with the BSC 23 receiving the BER measurements 15a and 15b (step 300), as described above.

However, if the timer 25 period expires before the BER measurements 15a improve to below the lower quality threshold 18 (step 352), the lower quality threshold 18 is incrementally increased (step 380) until the lower quality threshold 18 reaches to an ideal BER level for changing the data rate back to the original higher data rate of 14.4 kbps (step 382). For example, if the lower quality threshold 18 is originally set to a BER of two percent, but the acceptable BER for changing the data rate back to 14.4 kbps is six percent, the lower quality threshold 18 can be increased one percent each second until the BER associated with the lower quality threshold 18 reaches six percent.

If, at any time during this lower quality threshold 18 incrementation process, the BER measurements 15a (step 385) drop below the current lower quality threshold 18 (step 388), the BSC 23 orders the data rate to be changed back to the higher data rate of 14.4 kbps (step 358) and the process continues (step 360). In addition, if after the lower quality threshold 18 levels off at the ideal BER (step 382), the BER measurements 15a (step 390) drop below the ideal lower quality threshold 18 (step 355), the BSC 23 orders the higher data rate (step 358), and the process continues. Otherwise, the data rate remains at the lower data rate of 9.6 kbps (step 350). It should be understood that BER classes, instead of actual BER measurements can be used to set the upper and lower quality thresholds 16 and 18, respectively.

Figure 4:
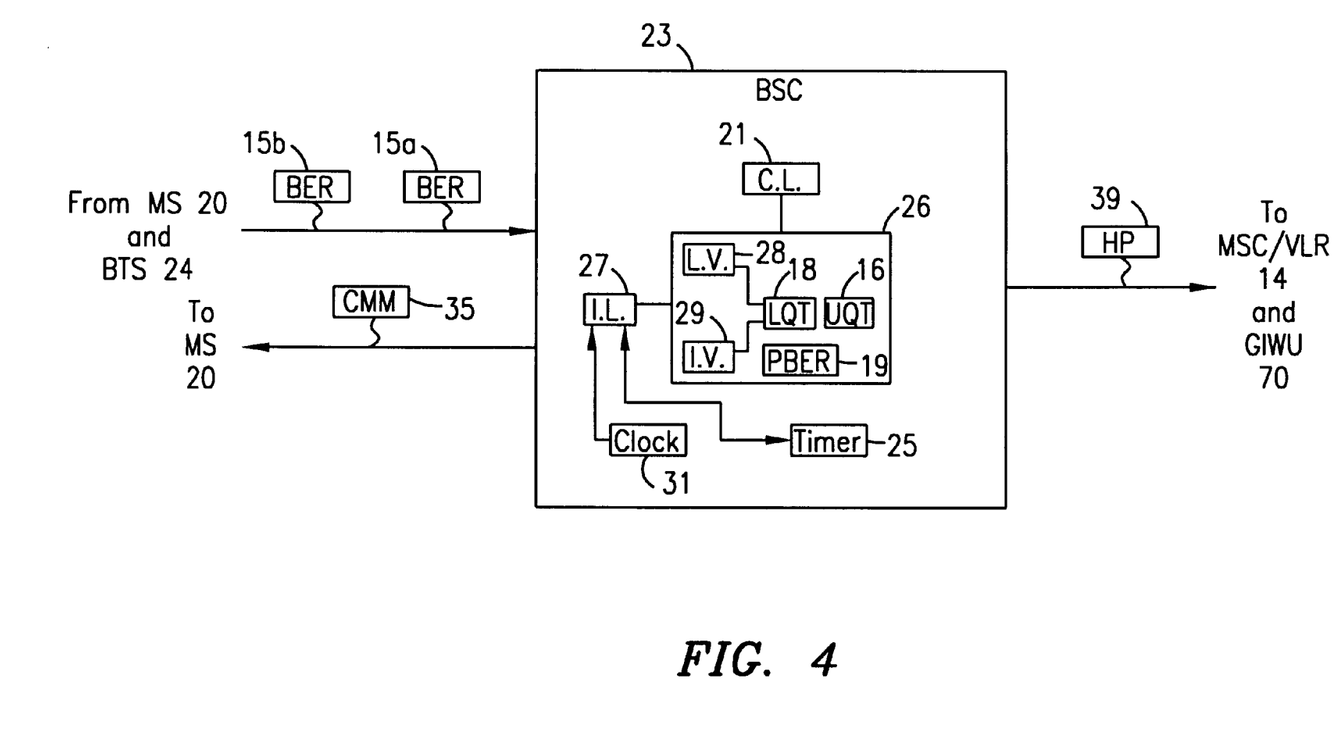
FIG. 4 illustrates the functionality within a Base Station Controller (BSC) responsible for modifying the data rate in accordance with embodiments of the present invention.

With reference now to FIG. 4 of the drawings, a more detailed illustration of the BSC 23 is shown. During the 14.4 kbps data call, when the BER measurements 15a come into the BSC 23, comparison logic 21 compares the BER measurements 15a for the serving cell 22a (shown in FIG. 2) with the upper quality threshold 16 stored in a memory 26 within the BSC 23. If the result of the comparison determines that the upper threshold 16 has been exceeded, the comparison logic 21 compares the BER measurements 15b for the neighboring cell(s) 22b (shown in FIG. 2) with predicted BER measurements 19 for the serving cell 22a at the 9.6 kbps data rate stored in the memory 26. If the comparison logic 21 determines that the 9.6 kbps data rate BER measurements 19 are better than the BER measurements 15b for the neighboring cell(s) 22b, the BSC 23 transmits the Channel Mode Modify message 35 to the MS 20, instructing the MS 20 to lower the data rate to the 9.6 kbps data rate. Thereafter, the BSC 23 transmits the Handover Performed message 39 to the MSC/VLR 14 and GIWU 70, as described above.

After the data rate has been reduced to the 9.6 kbps data rate, the BSC 23 initiates the timer 25 and sets the lower quality threshold 18 stored in the memory 26 to a lowest value 28, which is also stored in the memory 26. During the timer 25 period, the comparison logic 21 compares the continuously received BER measurements 15a with the lower quality threshold 18, and if the BER measurements 15a fall below this lower quality threshold 18, the BSC 23 transmits the Channel Mode Modify message 35 to the MS 20, instructing the MS 20 to change the data rate back to the 14.4 kbps data rate, transmits the Handover Performed message 39 to the MSC/VLR 14 and GIWU 70 and stops the timer 25.

If the BER measurements 15a do not fall below the lower quality threshold 18 during the timer 25 period, upon expiration of the timer 25, incrementation logic 27 increments the lower quality threshold 18 one unit. This unit could be a BER class, a BER percentage or other type of incrementation. The incrementation logic 27 continues to increment the lower quality threshold 18 one unit until the lower quality threshold 18 equals an ideal value 29 stored in the memory 26. The incrementation can be clocked by an internal clock 31 within the BSC 23, e.g., every second the lower quality threshold 18 is increased. Each time the lower quality threshold 18 is increased, the comparison logic 21 compares the current value of the lower quality threshold 18 with the ideal value 29 to determine if the ideal value 29 has been reached. In addition, the comparison logic 21 continues to compare the received BER measurements 15a with the current value of the lower quality threshold 18 to determine if the data rate should be changed back to the higher 14.4 kbps.

Figure 5:
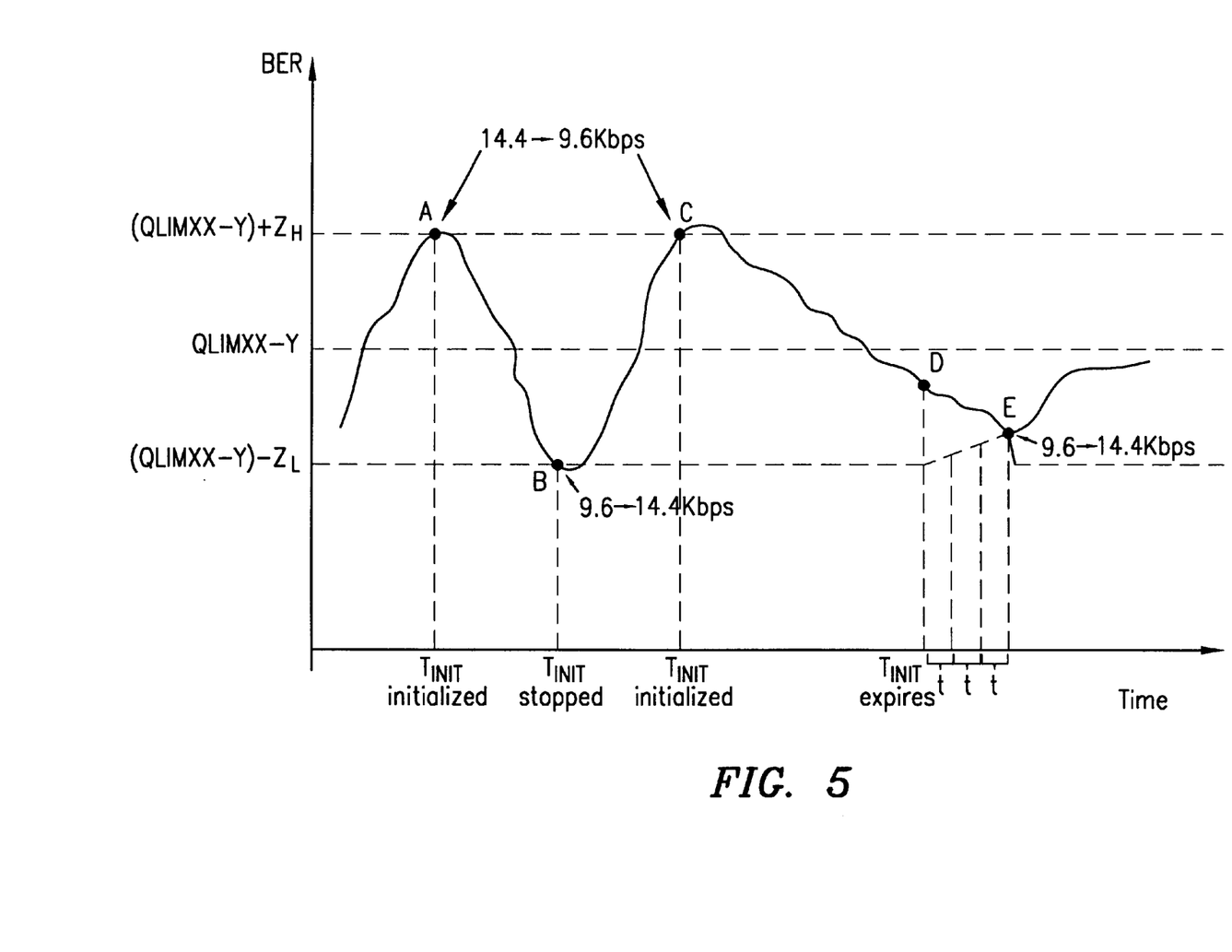
FIG. 5 illustrates the quality variance of a sample data call by modifying the air interface data rate using embodiments of the present invention.

As an example, as shown in FIG. 5 of the drawings, in the GSM system, the Urgency handover threshold in the up-link direction (MS 20 to BTS 24) is termed the Quality Limit Threshold Up-Link (QLIMUL) and the handover threshold in the down-link direction (BTS 24 to MS 20) is termed the Quality Limit Threshold Down-Link (QLIMDL). The quality thresholds 16 and 18 can be set based upon the QLIM. For example, the upper quality threshold (UQT) 16 can be set to the following equation:

$$UQT=(QLIMXX-Y)+Z_H, \quad \text{(Equation 1)}$$

and the lower quality threshold (LQT) 18 can be set to the following equation:

$$LQT=(QLIMXX-Y)-Z_L, \quad \text{(Equation 2)}$$

where XX is up-link (UL) or down-link (DL), QLIMXX-Y defines the ideal lower quality threshold 18 and Z defines the hysteresis for avoiding the ping-pong effect. In addition, Y and Z can be set such that:

$$0<(QLIMXX-Y)+Z_H<QLIMXX, \quad \text{(Equation 3)}$$

and $$0<(QLIMXX-Y)-Z_L<QLIMXX. \quad \text{(Equation 4)}$$

Therefore, when the BER measurements 15a of the serving cell 22a increase over the upper quality threshold (QLIMXX-Y)+$Z_H$, and there is no better cell 22b to hand over the call to, the data rate of the channel of the serving cell 22a can be changed to 9.6 kbps, at node A. At this time, the timer 25, denoted $T_{init}$, is initialized, and the lower quality threshold (QLIMXX-Y)-$Z_H$ is set to the lowest value 28. If during the timer $T_{init}$ period, the BER measurements 15a drop below the lower quality threshold (QLIMXX-Y)-$Z_H$, the data rate of the serving cell 22a is changed back to 14.4 kbps, at node B. The timer $T_{init}$ is also stopped at node B.

If the BER measurements 15a in the serving cell 22a once again equal or exceed the upper quality threshold (QLIMXX-Y)+$Z_H$, and there is no better cell 22b to hand over the call to, the data rate of the serving cell 22a is again changed to 9.6 kbps, at node C. The timer $T_{init}$ is again initialized, and the lower quality threshold (QLIMXX-Y)-$Z_L$ is set to the lowest value 28. After the timer $T_{init}$ expires, at node D, the lower quality threshold (QLIMXX-Y)-$Z_L$ is incremented until the lower quality threshold reaches QLIMXX-Y, which is the ideal value 29. That is, Z is decreased by a predefined unit at every time interval t until Z reaches the zero. If during the incrementation, the BER measurements 15a decrease below the current lower quality threshold (QLIMXX-Y)-$Z_{L-N}$, where N is the number of predefined units that Z has been decreased, the data rate is changed to the lower data rate of 9.6 kbps, at node E, and the timer $T_{init}$ is again stopped. In this way, the quality of the call can be ensured, the subscriber can use the original higher data rate as soon the quality improves and continuous ping-ponging between the higher and lower data rates can be avoided.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for maintaining the quality of transparent and non-transparent data calls within a cellular network, comprising:

a mobile station within said cellular network for engaging in a data call over an air interface at a high data rate;

a base station controller in wireless communication with said mobile station via said air interface for analyzing quality measurements indicating the quality of said data call over said air interface, comparing said quality measurements with an upper quality threshold and requesting said mobile station to change to a low data rate in response to said quality measurements exceeding said upper quality threshold, said low data rate being lower than said high data rate, said base station controller further for receiving additional quality measurements after said mobile station has changed to said low data rate, comparing said additional quality measurements to a lower quality threshold and requesting said mobile station to change back to said high data rate in response to said additional quality measurements dropping below said lower quality threshold; and a timer within said base station controller, said timer being initiated when said mobile station changes to said low data rate, said lower quality threshold being at a low value during said timer period, said lower quality threshold being incrementally increased to an ideal value upon expiration of said timer.

2. The telecommunications system of claim 1, wherein said quality measurements are bit error rate measurements.

3. The telecommunications system of claim 2, wherein said upper quality threshold is a bit error rate threshold.

4. The telecommunications system of claim 2, wherein said upper quality threshold is a bit error rate class threshold.

5. The telecommunications system of claim 1, wherein said data call is a non-transparent data call, said mobile station changing to said low data rate on a channel on said air interface that said mobile station was assigned to at said high data rate.

6. The telecommunications system of claim 1, wherein said data call is a transparent data call, said mobile station changing to said low data rate on a first channel on said air interface that said mobile station was assigned to at said high data rate and at least a second channel not previously assigned to said mobile station.

7. The telecommunications system of claim 1, further comprising:
an interworking unit connected to said base station controller for adapting a network data rate used by said cellular network to said high data rate used on said air interface, said base station controller requesting said interworking unit to change from said high data rate to said low data rate when said mobile station changes to said low data rate.

8. A telecommunications system for maintaining the quality of transparent and non-transparent data calls within a cellular network, comprising:
a mobile station within said cellular network for engaging in a data call over an air interface at a high data rate, said mobile station being served by a serving cell; and
a base station controller in wireless communication with said mobile station via said air interface for:
receiving quality measurements for at least one neighboring cell;
analyzing said quality measurements for said at least one neighboring cell at said high data rate and
comparing said quality measurements to predicted quality measurements in said serving cell at a low data rate, said base station controller requesting said mobile station to change to said low data rate when said quality measurements exceed said predicted quality measurements, said low data rate being lower than said high data rate.

9. A base station controller for maintaining the quality of a transparent or non-transparent data call at a high data rate within a cellular network, comprising:
a memory storing an upper quality threshold, a lower quality threshold, a low value and an ideal value;
comparison logic for comparing said upper quality threshold with quality measurements provided to said base station controller from said cellular network and determining that said high data rate should change to a low data rate in response to said quality measurements exceeding said upper quality threshold, said comparison logic further for comparing additional quality measurements received after said data call changed to said low data rate to said lower quality threshold and determining said data call should change back to said high data rate in response to said additional quality measurements dropping below said lower quality threshold;
a timer, said timer being initiated when said data call changes to said low data rate, said lower quality threshold being set to said low value during said timer period; and
incrementation logic for incrementally increasing said lower quality threshold to said ideal value upon expiration of said timer.

10. The base station controller of claim 9, wherein said quality measurements are bit error rate measurements.

11. The base station controller of claim 10, wherein said upper quality threshold is a bit error rate threshold.

12. The base station controller of claim 10, wherein said upper quality threshold is a bit error rate class threshold.

13. The base station controller of claim 9, wherein said data call is a non-transparent data call, said base station controller requesting said data call to change to said low data rate on a channel originally assigned to said data call at said high data rate.

14. The base station controller of claim 9, wherein said data call is a transparent data call on a first channel, said base station controller requesting said data call to change to said low data rate on second and third channels.

15. A base station controller for maintaining the quality of a transparent or non-transparent data call at a high data rate within a serving cell of a cellular network, comprising:
a memory for storing predicted quality measurements in said serving cell at a low data rate, said low data rate being lower than said high data rate,
a means for storing quality measurements for at least one neighboring cell; and
comparison logic for comparing said quality measurements for said at least one neighboring cell at said high data rate with said predicted quality measurements in said serving cell at said low data rate, said base station controller determining that said data call should change to said low data rate when said quality measurements for said at least one neighboring cell exceed said predicted quality measurements.

16. A method for a base station controller to maintain the quality of a transparent or non-transparent data call at a high rate within a cellular network, comprising the steps of:
receiving quality measurements indicating the quality of said data call at said high rate;
comparing said quality measurements with an upper quality threshold;
determining that said data call should change to a low data rate in response to said quality measurements exceeding said upper quality threshold, said low data rate being lower than said high data rate;
initiating a timer when said data call changes to said low data rate;
comparing additional quality measurements received after said data call changed to said low data rate to a lower quality threshold, said lower quality threshold being set at a low value during said timer period and incrementally increased to an ideal value upon expiration of said timer; and
determining that said data call should change back to said high data rate in response to said additional quality measurements dropping below said lower quality threshold.

17. The method of claim 16, wherein said data call is a non-transparent data call, said step of determining further comprising the step of:
changing to said low data rate on a channel originally assigned to said data call at said high data rate.

18. The method of claim 16, wherein said data call is a transparent data call on a first channel, said step of determining further comprising the step of:
changing to said low data rate on second and third channels.

19. A method for a base station controller to maintain the quality of a transparent or non-transparent data call at a high data rate within a serving cell of a cellular network, comprising the steps of:
receiving quality measurements for at least one neighboring cell;
analyzing said quality measurements for said at least one neighboring cell at said high data rate; and
comparing said quality measurements to predicted quality measurements in said serving cell at a low data rate, said base station controller determining that said data call should change to said low data rate when said quality measurements exceed said predicted quality measurements, said low data rate being lower than said high data rate.

20. A method for maintaining the quality of transparent and non-transparent data calls within a cellular network, comprising the steps of:

engaging, by a mobile station within said cellular network, in a data call over an air interface at a high data rate;

receiving at a base station controller in wireless communication with said mobile station via said air interface quality measurements indicating the quality of said data call over said air interface;

comparing said quality measurements with an upper quality threshold stored within said base station controller;

sending a message from said base station controller to said mobile station requesting said mobile station to change to a low data rate in response to said quality measurements exceeding said upper quality threshold, said low data rate being lower than said high data rate;

initializing a timer when said mobile station changes to said low data rate;

receiving at said base station controller additional quality measurements after said mobile station changed to said low data rate;

comparing said additional quality measurements to a lower quality threshold stored within said base station controller, said lower quality threshold being set at a low value during said timer period and incrementally increased to an ideal value upon expiration of said timer; and     sending an additional message from said base station controller to said mobile station requesting said mobile station to change back to said high data rate in response to said additional quality measurements dropping below said lower quality threshold.

21. The method of claim 20, wherein said data call is a non-transparent data call, and further comprising the step of:

changing, by said mobile station, to said low data rate on a channel on said air interface that said mobile station was assigned to at said high data rate.

22. The method of claim 20, wherein said data call is a transparent data call, and further comprising the step of:

changing, by said mobile station, to said low data rate on a first channel on said air interface that said mobile station was assigned to at said high data rate and at least a second channel not previously assigned to said mobile station.

23. The method of claim 20, wherein said message is a Channel Mode Modify message.

24. The method of claim 20, wherein said additional message is a Channel Mode Modify message.

25. The method of claim 20, further comprising the step of:

sending an additional message from said base station controller to an interworking unit connected to said base station controller and responsible for adapting a network data rate used on said cellular network to said high data rate used on said air interface, said additional message requesting said interworking unit to change from said high data rate to said low data rate when said mobile station changes to said low data rate.

26. The method of claim 25, wherein said additional message is a Handover Performed message.

27. A method for maintaining the quality of transparent and non-transparent data calls within a cellular network, comprising the steps of:

engaging, by a mobile station within a serving cell of said cellular network, in a data call over an air interface at a high data rate;

receiving at a base station controller in wireless communication with said mobile station via said air interface, quality measurements for at least one neighboring cell at said high data rate; and     comparing said quality measurements to predicted quality measurements in said serving cell at a low data rate, said base station controller requesting said mobile station to change to said low data rate when said quality measurements exceed said predicted quality measurements, said low data rate being lower than said high data rate.

* * * * *